United States Patent
Kotake et al.

[11] Patent Number: 6,068,822
[45] Date of Patent: May 30, 2000

[54] DESULFORIZATION METHOD AND DESULFURIZATION APPARATUS IN GEOTHERMAL POWER PLANT

[75] Inventors: Shinichiro Kotake; Atsushi Tatani, both of Tokyo, Japan

[73] Assignee: Mitsubishi Heavy Industries, Ltd., Tokyo, Japan

[21] Appl. No.: 08/934,211

[22] Filed: Sep. 19, 1997

[30] Foreign Application Priority Data

Mar. 24, 1997 [JP] Japan ..................................... 9-088898

[51] Int. Cl.⁷ ........................... B01D 53/48; B01D 53/50; B01D 53/52
[52] U.S. Cl. ..................... 423/220; 423/224; 423/243.08; 423/551; 423/DIG. 19
[58] Field of Search ........................ 423/DIG. 19, 243.08, 423/555, 224, 220, 551

[56] References Cited

U.S. PATENT DOCUMENTS

| | | | |
|---|---|---|---|
| 3,920,794 | 11/1975 | La Mantia et al. | 423/242 |
| 4,844,162 | 7/1989 | Maassen et al. | 166/267 |
| 5,312,609 | 5/1994 | College | 423/243.08 |

FOREIGN PATENT DOCUMENTS

| | | | |
|---|---|---|---|
| 54-37097 | 3/1979 | Japan | 423/555 |
| 60-201011 | 10/1985 | Japan | |
| 64-008363 | 1/1989 | Japan | |

OTHER PUBLICATIONS

Kohl et al. Gas Purification, 4th Edition, Gulf Publishing Co. Houston TX; ISBN 0–87201–314–6; pp. 333–334, 341–349 & 420–421, 1985.

*Primary Examiner*—Steven P. Griffin
*Assistant Examiner*—Timothy C. Vanoy
*Attorney, Agent, or Firm*—Alston & Bird LLP

[57] ABSTRACT

An uncondensed gas in steam discharged from a turbine in a geothermal power plant and separated from water with a condenser is treated by a desulfurization method comprising the combustion step of combusting the uncondensed gas in the steam to convert hydrogen sulfide in the uncondensed gas to a sulfurous acid gas and the absorption reaction step of bringing a combustion gas coming from the combustion step into gas-liquid contact with an absorbent slurry and further bringing air into air-liquid contact with the absorbent slurry to allow the absorbent slurry to absorb the sulfurous acid gas and undergo oxidation and neutralization to exhaust desulfurized gas and to convert the absorbent slurry to a sulfate slurry, whereby detrimental hydrogen sulfide is removed from the steam exhausted after the use of the steam for power generation in the geothermal power plant.

3 Claims, 3 Drawing Sheets

DESULFORIZATION METHOD AND DESULFURIZATION APPARATUS IN GEOTHERMAL POWER PLANT

BACKGROUND OF THE INVENTION

1. Field of the Invention

The present invention relates to a desulfurization method, which can take part in environmental protection by removing detrimental hydrogen sulfide from steam exhausted from a geothermal power plant after use, and which permits the recovery of a useful byproduct from a removed sulfur component depending upon an absorbent, and a desulfurization apparatus therefor.

2. Description of the Related Art

Geothermal power generation is performed by ejecting geothermal steam through a well by taking advantage of high heat accumulated inside the earth, introducing the geothermal steam into a turbine, and driving the turbine to generate electricity. The geothermal power generation is being considered promising as an energy source following waterpower, thermal power and atomic power.

Meanwhile, geothermal steam generally contains a relatively large amount of carbon dioxide and a small amount of hydrogen sulfide. In conventional general thermal power plants, steam discharged from the turbine is cooled with a condenser to separate it into condensed water and an uncondensed gas, and the condensed water is brought back to a reducing well or recycled as a coolant, while the uncondensed gas containing the above hydrogen sulfide is released into atmosphere as it is.

The hydrogen sulfide contained in geothermal steam comes to be contained in the above uncondensed gas and released into atmosphere as it is, which causes an air pollution problem.

In recent years, therefore, constitutions having a desulfurization apparatus for removing the above hydrogen sulfide in the uncondensed gas have been proposed, as is disclosed, e.g., in Japanese Patent Provisional Publications Nos. 60-201011/'85 and 64-8363/'89.

However, conventional desulfurization apparatuses such as the above apparatuses do not take into account the disposal and recycling of a removed sulfur component in particular, and they are insufficient for practical performance in view of easiness in the disposal of a desulfurization byproduct and the redemption of an operation cost.

SUMMARY OF THE INVENTION

It is therefore an object of the present invention to provide a desulfurization method in which detrimental hydrogen sulfide is removed from exhausted steam after the use of the steam for power generation in a geothermal power plant so that the method can take part in environmental protection, and a useful byproduct is formed and recovered from a removed sulfur component so that the disposal of a desulfurization byproduct can be eased and that the operation cost can be decreased, and a desulfurization apparatus therefor.

The method of desulfurization in a geothermal power plant for achieving the above object, provided by the present invention, is a method of removing hydrogen sulfide from an uncondensed gas contained in steam discharged from a turbine and separated with a condenser in a geothermal power plant for generating electricity by driving the turbine with geothermal steam, the method comprising the combustion step of combusting the above uncondensed gas to convert hydrogen sulfide contained in the uncondensed gas to sulfurous acid gas and the absorption reaction step of bringing a combustion gas containing the sulfurous acid gas and coming out of the combustion step into gas-liquid contact with an absorbent slurry containing, as an absorbent, a calcium compound and/or a sodium compound, further bringing air into gas-liquid contact with the absorbent slurry, thereby allowing the absorbent slurry to absorb the sulfurous acid gas and undergo oxidation and neutralization to exhaust a desulfurization exhaust gas and thereby converting the above absorbent slurry to a sulfate slurry.

In the method of desulfurization in a geothermal power plant, provided by the present invention, hydrogen sulfide gas contained in an uncondensed gas is converted to sulfurous acid gas in the combustion step, and the sulfurous acid gas is absorbed into the absorbent slurry in the absorption and reaction step. As a result, a gas to be exhausted is free of the hydrogen sulfide and clean.

In the absorption reaction step, further, the absorbent slurry which has absorbed the above sulfurous acid gas is brought into gas-liquid contact with air to be oxidized, and further undergoes a neutralization reaction to form a sulfate slurry containing sulfates (gypsum and/or sodium sulfate). Of the above sulfates contained in the sulfate slurry, sodium sulfate is harmless and has a high solubility so that the sodium sulfate can be disposed of in the form of a component contained in the above sulfate slurry. On the other hand, gypsum out of the above sulfates can be easily recovered as a byproduct, for example, by solid-liquid separation of the above slurry. That is, the above sulfate slurry can be easily disposed of in any case.

According to the present invention, therefore, detrimental hydrogen sulfide in an uncondensed gas separated from the steam exhausted from a geothermal power plant is removed, and as a byproduct, a sulfate slurry which can be easily disposed of is formed. For these reasons, the method of the present invention can participate in environmental protection and obviates troublesome treatment of a byproduct for forming a harmless product (e.g., safening treatment such as dilution with a large amount of water), so that there is produced an industrially practical advantage that the operation is eased.

Further, the desulfurization apparatus in a geothermal power plant, provided by the present invention, is a desulfurization apparatus for removing hydrogen sulfide from an uncondensed gas in the steam discharged from a turbine and separated with a condenser in a geothermal power plant for generating electricity by driving the turbine with geothermal steam, the apparatus comprising a combustion furnace for combusting the above uncondensed gas, a gas-liquid contactor for bringing a combustion gas containing a sulfurous acid gas and coming from the combustion furnace into gas-liquid contact with an absorbent slurry containing, as an absorbent, a calcium compound and/or a sodium compound, and an air supply for supplying the gas-liquid contactor with air to bring the air into gas-liquid contact with the absorbent slurry which has absorbed the above sulfurous acid gas.

Further, the desulfurization apparatus in a geothermal power plant, provided by the present invention, is a desulfurization apparatus for removing hydrogen sulfide from an uncondensed gas in the steam discharged from a turbine and separated with a condenser in a geothermal power plant for generating electricity by driving the turbine with geothermal steam, the apparatus comprising a combustion furnace for combusting the above uncondensed gas, a reactor for desulfurization by bringing a combustion gas containing a sulfurous acid gas and coming from the combustion furnace into gas-liquid contact with a calcium-compound-containing slurry, an air supply for supplying air into the reactor to bring the air into gas-liquid contact with the calcium-compound-containing slurry which has absorbed the above sulfurous acid gas, and a solid-liquid separator for separating a gypsum slurry withdrawn from the above reactor into a solid and a liquid.

Further, in each of the above desulfurization apparatuses in a geothermal power plant, provided by the present invention, hydrogen sulfide contained in the uncondensed gas is converted to a sulfurous acid gas by the combustion in the combustion furnace, and the sulfurous acid gas is absorbed into the absorbent slurry during the gas-liquid contact with the absorbent slurry by the gas-liquid contactor (or reactor). Therefore, a gas discharged from the gas-liquid contactor is free of hydrogen sulfide and clean. Further, the absorbent slurry absorbs the above sulfurous acid gas and is brought into contact with air, which is supplied with the air supply, to be oxidized, and further, it undergoes a neutralization reaction to form sulfates (gypsum and/or sodium sulfate) corresponding to the kinds of absorbents.

Of the above sulfates contained in the slurry, the sodium sulfate is harmless and has a high solubility, and it can be therefore disposed of in the form of a component contained in a liquid component of the above slurry as it is. On the other hand, the gypsum out of the above sulfates can be recovered as a useful byproduct, for example, by the solid-liquid separation of the above slurry. That is, the above slurry can be easily disposed of in any case.

According to the present invention, therefore, detrimental hydrogen sulfide in the uncondensed gas separated from exhausted steam in a geothermal power plant is removed, and further, as a byproduct, a slurry that can be easily disposed of is formed and can be disposed of as a harmless effluent, or industrially very useful gypsum is formed. Therefore, not only the method of the present invention can take part in environmental protection, but also there can be obtained industrially very practical advantages that the method of the present invention obviates the safening treatment (e.g., safening treatment of dilution with a large amount of water), that the operation is eased, and further that when the byproduct is gypsum, the operation cost can be redeemed owing to the profit of sale thereof.

DETAILED DESCRIPTION OF PREFERRED EMBODIMENTS

The method of desulfurization in a geothermal power plant for achieving the above object, provided by the present invention, is a method of removing hydrogen sulfide from an uncondensed gas contained in steam discharged from a turbine and separated with a condenser in a geothermal power plant for generating electricity by driving the turbine with geothermal steam, the method comprising the combustion step of combusting the above uncondensed gas to convert hydrogen sulfide contained in the uncondensed gas to sulfurous acid gas and the absorption reaction step of bringing a combustion gas containing the sulfurous acid gas and coming out of the combustion step into gas-liquid contact with an absorbent slurry containing, as an absorbent, a calcium compound and/or a sodium compound, further bringing air into gas-liquid contact with the absorbent slurry, thereby allowing the absorbent slurry to absorb the sulfurous acid gas and undergo oxidation and neutralization to exhaust a desulfurization exhaust gas and thereby converting the above absorbent slurry to a sulfate slurry.

In a first preferred embodiment of the method of desulfurization in a geothermal power plant, provided by the present invention, a calcium compound is used as the above absorbent, and in the above absorption reaction step, a gypsum slurry is formed as the above sulfate slurry and there is also provided a gypsum separation step in which the gypsum slurry formed in the above absorption reaction step is solid-liquid separated to obtain a gypsum cake.

Therefore, in the first preferred embodiment of the method of desulfurization in a geothermal power plant, provided by the present invention, a calcium compound is particularly used as an absorbent to form a gypsum slurry containing gypsum as the above sulfate, and the gypsum slurry is separated into a solid and a liquid in the gypsum separation step, to obtain gypsum in the form of a cake, which gypsum is industrially useful as a raw material for a construction material.

That is, in the above method of desulfurization, detrimental hydrogen sulfide in the uncondensed gas separated from exhaust gas in a geothermal power plant is removed, and as a byproduct, industrially useful gypsum is obtained in the form of a cake that can be easily handled. Therefore, not only the above method of desulfurization can participate in environmental protection, but also there can be obtained industrially remarkably practical advantages that the troublesome safening treatment of a byproduct is obviated so that the operation is eased and that the operation cost can be easily redeemed owing to the profit of sale of the gypsum which is the byproduct.

In a second preferred embodiment of the method of desulfurization in a geothermal power plant, provided by the present invention, there is provided the step of heating gypsum, in which the gypsum cake obtained in the above gypsum separation step is heated to form a hemihydrate.

Therefore, in the second preferred embodiment of the method of desulfurization in a geothermal power plant, provided by the present invention, the gypsum cake obtained in the above gypsum separation step is heated to form a hemihydrate. Therefore, a hemihydrate having a higher commercial value can be obtained as a byproduct.

In a third preferred embodiment of the method of desulfurization in a geothermal power plant, provided by the present invention, a sodium compound is used as the above absorbent, and in the above absorption reaction step, a slurry containing sodium sulfate is formed as the above sulfate.

Therefore, the formed sulfate slurry can be easily disposed of as a slurry mainly containing harmless sodium sulfate alone.

That is, in the above method of desulfurization, detrimental hydrogen sulfide in the uncondensed gas separated from exhaust gas in a geothermal power plant is removed, and further, the sulfate as a byproduct can be easily disposed of as a harmless slurry. Therefore, not only the above method of desulfurization can participate in environmental protection, but also there can be obtained industrially remarkably practical advantages that the troublesome safening treatment of a byproduct and those operations of solid-liquid separation with a large-scale apparatus (centrifugal separator, etc.), transportation and storage of the byproduct are no longer necessary so that the operation is remarkably eased.

In a fourth preferred embodiment of the method of desulfurization in a geothermal power plant, provided by the present invention, there is provided a solid separation step in which the sulfate slurry obtained in the absorption reaction step in the third preferred embodiment is filtered to separate a floating solid. Therefore, impurities which may be contained in the absorbent, etc., are removed as the above floating solid, and the filtrate can be easily disposed of as a harmless effluent containing sodium sulfate alone.

Further, the desulfurization apparatus in a geothermal power plant, provided by the present invention, is a desulfurization apparatus for removing hydrogen sulfide from an uncondensed gas in the steam discharged from a turbine and separated with a condenser in a geothermal power plant for generating electricity by driving the turbine with geothermal steam, the apparatus comprising a combustion furnace for combusting the above uncondensed gas, a gas-liquid contactor for bringing a combustion gas containing a sulfurous acid gas and coming from the combustion furnace into gas-liquid contact with an absorbent slurry containing, as an absorbent, a calcium compound and/or a sodium compound, and an air supply for supplying the gas-liquid contactor with air to bring the air into gas-liquid contact with the absorbent slurry which has absorbed the above sulfurous acid gas.

Further, the desulfurization apparatus in a geothermal power plant, provided by the present invention, is a desulfurization apparatus for removing hydrogen sulfide from an uncondensed gas in the steam discharged from a turbine and separated with a condenser in a geothermal power plant for generating electricity by driving the turbine with geothermal steam, the apparatus comprising a combustion furnace for combusting the above uncondensed gas, a reactor for desulfurization by bringing a combustion gas containing a sulfurous acid gas and coming from the combustion furnace into gas-liquid contact with a calcium-compound-containing slurry, an air supply for supplying air into the reactor to bring the air into gas-liquid contact with the calcium-compound-containing slurry which has absorbed the above sulfurous acid gas, and a solid-liquid separator for separating a gypsum slurry withdrawn from the above reactor into a solid and a liquid.

Working embodiments of the present invention will be explained with reference to drawings hereinafter.

EXAMPLE 1

Figure 1:
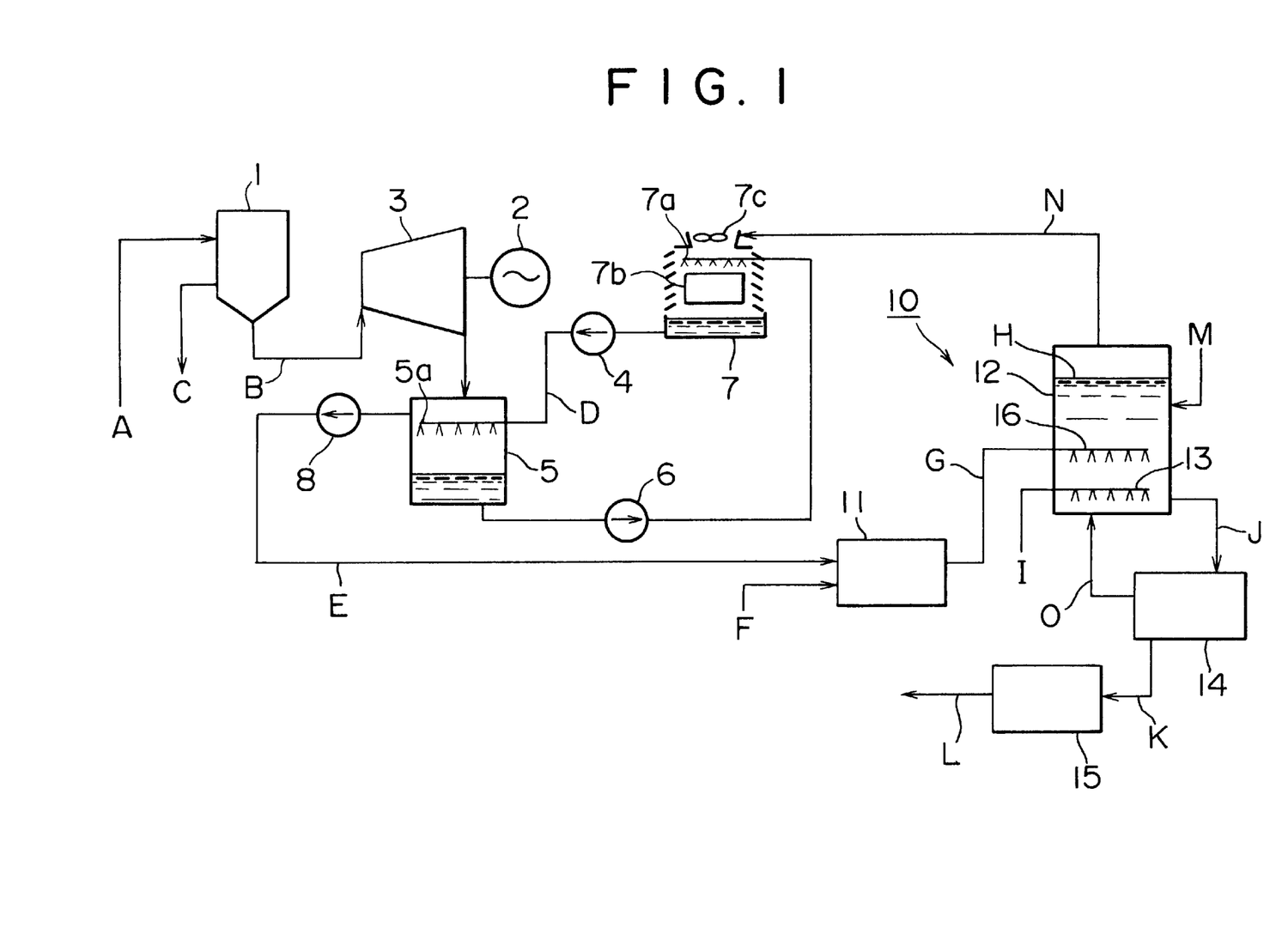
FIG. 1 shows an entire geothermal power plant in Example 1 of the present invention.

Example 1 using a calcium compound (limestone) as an absorbent will be explained first. FIG. 1 shows a constitution example of a geothermal power plant having the desulfurization apparatus according to the present invention.

The above geothermal power plant has a gas-liquid separator 1 for separating geothermal fluid A ejected through a well into geothermal steam B and hot water C, a turbine 3 which is driven with the geothermal steam B to actuate a power generator 2, a condenser 5 for cooling the geothermal steam B discharged from the turbine 3 with coolant D introduced with a pump 4 to form condensed water, a cooling column 7 for cooling water withdrawn from a bottom portion of the condenser 5 with a pump 6 and discharging the cooled water as a coolant D, and a desulfurization apparatus 10 for removing hydrogen sulfide from uncondensed gas E in the geothermal steam B introduced from a top portion of the condenser 5 with an extraction pump 8.

The condenser 5 in this embodiment has spray nozzles 5a for spraying coolant D and has a constitution in which geothermal steam B discharged from the turbine 3 is brought into contact with coolant D sprayed through the spray nozzles 5 to be condensed, the resulting water is reserved in a bottom portion thereof together with coolant D, and reserved water is introduced out with the pump 6.

The cooling column 7 has spray nozzles 7a for spraying water introduced from the condenser 5 with the pump 6, a filler 7b for cooling the water by bringing the water into efficient contact with air taken in from outside, and a fan 7c for releasing internal air upwardly through a top portion and generating negative pressure for taking in outside air.

Part of water reserved in the bottom portion of the condenser 5 may be returned into the earth through a reduction well. Further, part of hydrogen sulfide contained in steam B is dissolved in water reserved in the bottom portion of the condenser 5, and the water comes to have a considerable degree of acidity when left to stand. Therefore, an alkali agent such as sodium hydroxide may be poured into the water introduced out of the condenser 5 for the protection of materials of the condenser 5 and the cooling column 7. Further, a tubing line for introducing uncondensed gas E out of the condenser 5 may be provided with a mist separator for removing mist. Hot water C separated with the gas-liquid separator 1 can be returned into the earth through a reduction well, while it may be used for a heated swimming pool, a local heating, etc., by the recovery of heat before it is returned into the earth.

The desulfurization apparatus 10 has a combustion furnace 11 for combusting uncondensed gas E by reacting it with air F, a reactor 12 (gas-liquid contactor) for removing sulfurous acid gas by absorption by bringing combustion gas G, which results from the combustion of uncondensed gas E in the combustion furnace 11, into gas-liquid contact with a calcium-compound-containing slurry H (absorbent slurry) inside and for discharging desulfurized gas N, an air blower tube 13 (air supply) for blowing air I into the slurry in the reactor 12 in the form of numerous fine air bubbles, a solid-liquid separator 14, such as a centrifugal separator, for separating slurry J (gypsum slurry) withdrawn from the reactor 12 into a solid and a liquid, and a gypsum heating device 15, such as a combustion furnace, for heating a solid K (gypsum cake of gypsum dihydrate) obtained from the above solid-liquid separator 14 up to approximately 120° C. to 150° C. to form a hemihydrate L.

In the above constitution, the reactor 12 is supplied with a calcium compound M (absorbent) such as limestone ($CaCO_3$) from a silo (not shown) as required, and the combustion gas G is blown, in the form of numerous fine gas bubbles, into the slurry through a gas blower tube 16 provided in a bottom portion of the reactor 12. In the above constitution, the desulfurized gas N which is introduced out of a top portion of the reactor 12 is introduced to a top portion of the cooling column 7 and diffused into atmosphere with a fan 7c.

The supply amount of the calcium compound N is determined depending upon the amount of sulfurous acid gas to be absorbed. In an actual operation, for example, the slurry in the reactor 12 is detected for a pH, and the supply amount can be controlled such that the pH value is maintained in a weakly acidic region.

Further, the calcium compound M may be formed into a slurry in a separate slurry tank in advance and supplied to the reactor 12. A rotary atomizer or an arm-rotary sparger may be provided in place of the air blower tube 13 or the gas blower tube 16. Naturally, the reactor 12 may be provided with a stirrer for promoting the gas-liquid contact and preventing the precipitation of a solid.

Further, the concentration of hydrogen sulfide in uncondensed gas E is generally 4%, and the rest is almost all carbon dioxide. Preferably, therefore, the combustion furnace 11 has a constitution in which a combustion aid such as natural gas is supplied or it is packed with a catalyst such as a platinum-containing catalyst for sufficiently promoting the combustion reaction.

The gypsum heating device 15 may have a constitution in which the gypsum cake K of gypsum dihydrate is heated by combusting a fuel such as natural gas, while it may have a constitution in which the gypsum cake K is heated, for example, by utilizing heat of geothermal fluid A or hot water C as a heat source or a constitution in which a combination of both is utilized. When geothermal fluid A or hot water C is used, it is not required to reserve a fuel such as natural gas so that the geotherm can be effectively used and that the operation cost can be decreased.

The performance of the desulfurization apparatus 10 in the above geothermal power plant, i.e., one example of the desulfurization method of the present invention, performed with the desulfurization apparatus 10, will be explained hereinafter.

First, by the combustion of uncondensed gas E in the combustion furnace 11, hydrogen sulfide ($H_2S$) in the uncondensed gas E is converted to sulfurous acid gas ($SO_2$) according to the following reaction formula (1) (combustion step).

$$H_2S + 3/2O_2 \rightarrow SO_2 + H_2O \qquad (1)$$

Then, combustion gas G containing the sulfurous acid gas, which results from the combustion of the uncendensed gas E, is blown into the slurry in the reactor 12 through the gas blower tube 16 in the form of numerous gas bubbles, and brought into contact with the calcium-compound-containing slurry H in the reactor 12. The sulfurous acid gas is absorbed, and a clean desulfurized gas N containing almost no sulfurous acid gas is given and, in this case, diffused into atmosphere through a top portion of the cooling column 7 with the fan 7c.

On the other hand, while the calcium-compound-containing slurry H in the reactor 12 absorbs sulfurous acid gas contained in combustion gas G which has been blown thereinto, the slurry H is oxidized by its contact to air bubbles blown thereinto through the air blower tube 13 and further undergoes a neutralization reaction to form gypsum (gypsum dihyrate) (absorption reaction step). Main reactions taking place in these treatments proceed through the following reaction formulae (2) to (4).

$$SO_2 + H_2O \rightarrow H^+ + HSO_3^- \qquad (2)$$

$$H^+ + HSO_3^- + 1/2O_2 \rightarrow 2H^+ + SO_4^{2-} \qquad (3)$$

$$2H^+ + SO_4^{2-} + CaCO_3 + H_2O \rightarrow CaSO_4 \cdot 2H_2O + CO_2 \qquad (4)$$

In the above steady state, there is formed a state in which gypsum dihydrate and a small amount of limestone are suspended in the reactor 12. The suspension as gypsum slurry J is supplied to the solid-liquid separator 14 and dehydrated, and a gypsum cake K of gypsum dihyrate having little water content is taken out (gypsum separation step). Meanwhile, a filtrate O from the solid-liquid separator 14 is introduced to the reactor 12 and recycled as water for constituting the slurry in this case.

The gypsum cake of gypsum dehydrate introduced out of the solid-liquid separator 14 is heated, e.g., to approximately 120 to 150° C. under atmospheric pressure with the gypsum heating device 15 to evaporate adhering water and forms a β-hemihydrate L according to the following reaction formula (5) (gypsum heating step).

$$CaSO_4 \cdot 2H_2O \rightarrow CaSO_4 \cdot 1/2H_2O + 3/2H_2O \qquad (5)$$

Hemihydrate itself has a relatively high commercial value. Since, however, it is altered to gypsum dihydrate when supplied with crystal water, it is required to be shielded from moisture and cannot be stored outdoors, and it is therefore required to take moisture prevention into account for storing and transporting it. On the other hand, gypsum dihydrate has a relatively low commercial value at present, while it has adequate properties as a raw material for cement having large-scale markets and it is easy to handle since it can be stored outdoors.

In some cases, therefore, this Example may have a constitution in which the above gypsum heating step is omitted and the gypsum cake K of gypsum dihydrate is transported out as a byproduct as it is. In this constitution, the above gypsum heating device 15 is no longer necessary.

As described above, according to the above desulfurization apparatus or desulfurization method, detrimental hydrogen sulfide in the uncondensed gas separated from steam exhausted from a geothermal power plant is removed, and industrially remarkably useful gypsum is obtained as a byproduct. Therefore, not only the above apparatus or desulfurization method participate in environmental protection, but also there can be produced industrially practical advantages that the troublesome safening treatment of a byproduct (e.g., treatment of dilution with a large amount of water) is no longer necessary so that the operation is eased and that the operation cost is redeemed by a profit of sale of the gypsum which is a byproduct.

Further, when a device using geothermal fluid A or hot water C is used as the gypsum heating device 15 for heating gypsum dihydrate K, geotherm can be effectively used and the operation cost is further decreased.

EXAMPLE 2

Figure 2:
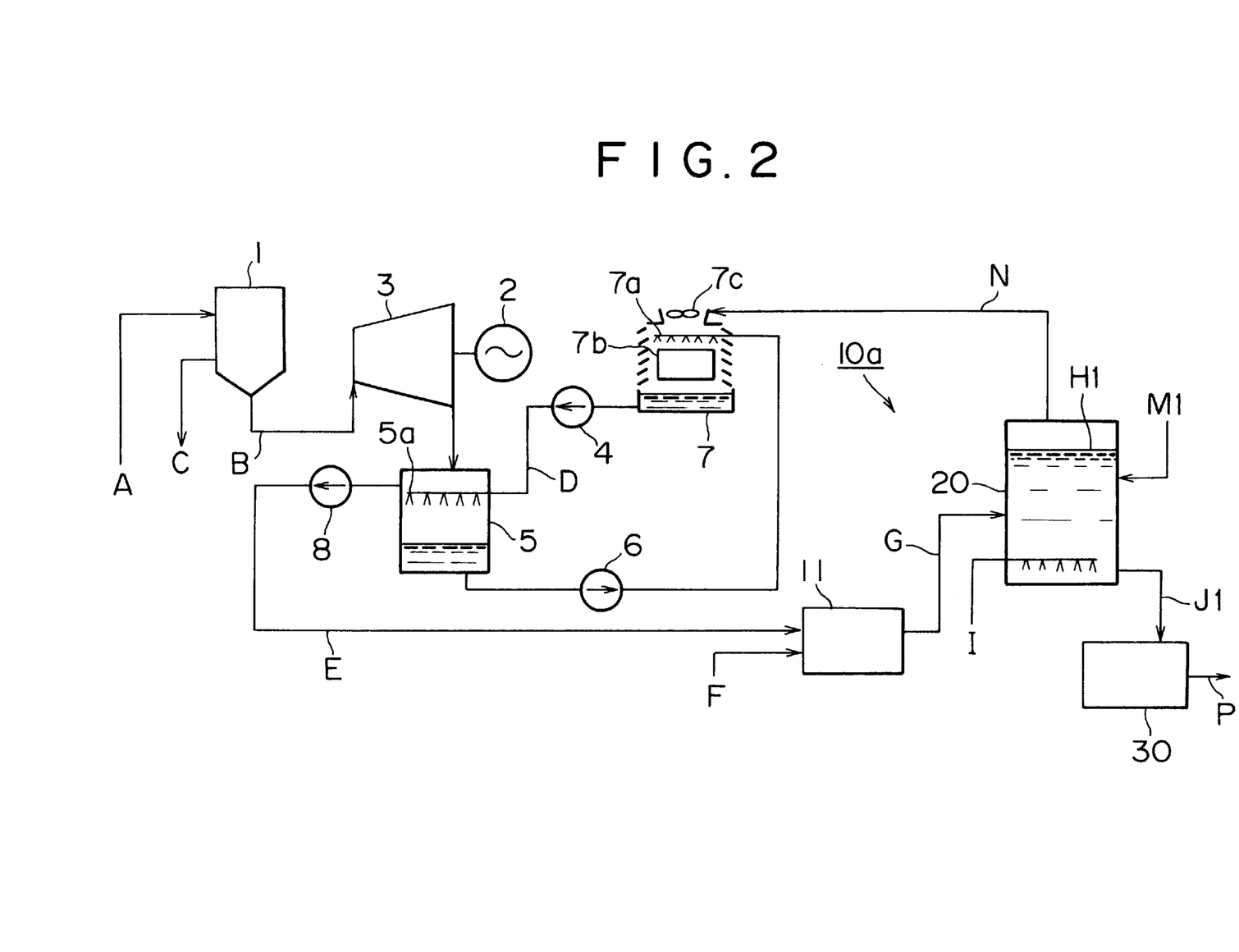
FIG. 2 shows an entire geothermal power plant in Example 2 of the present invention.
Figure 3:
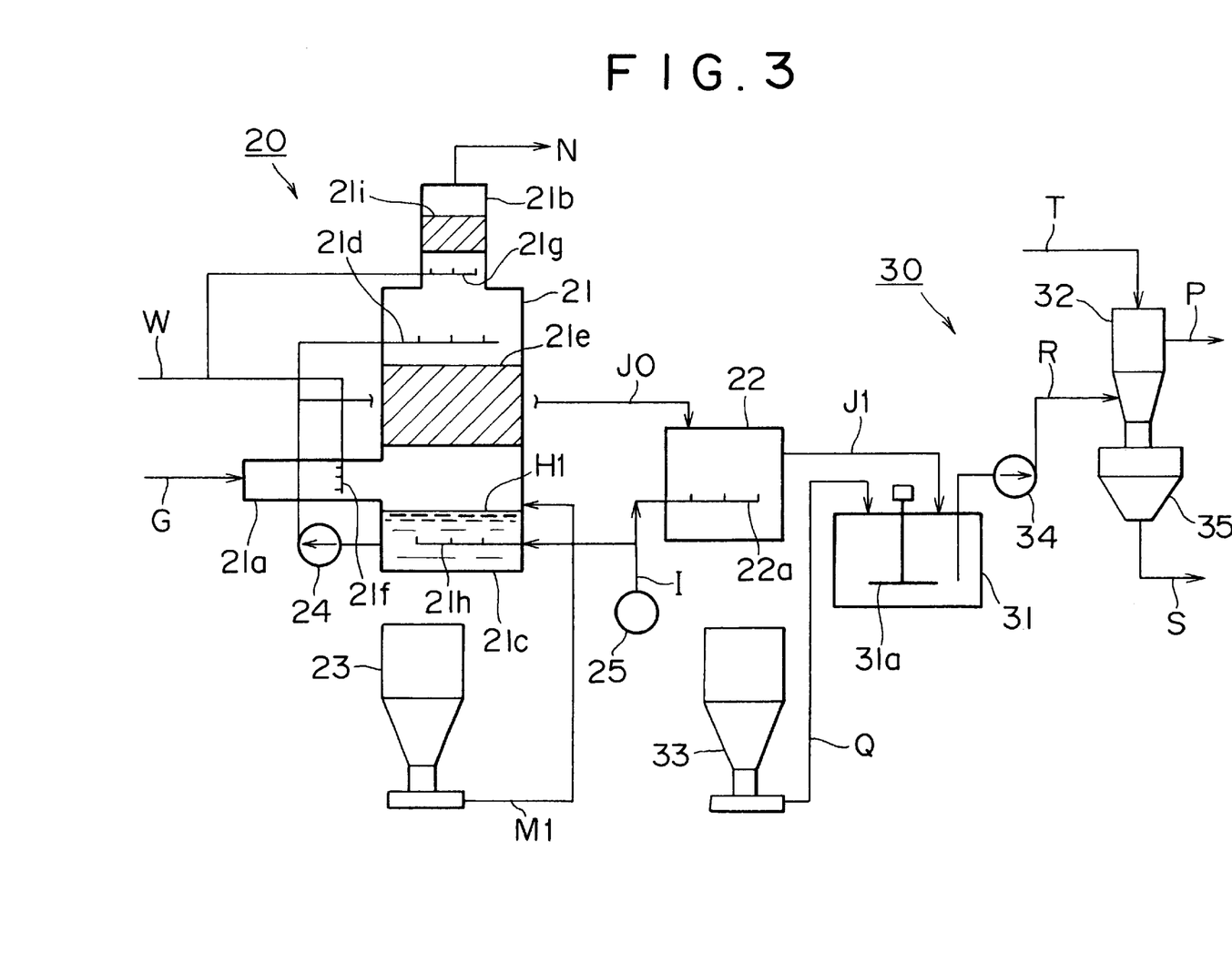
FIG. 3 shows a detailed constitution of a desulfurization apparatus in Example 2 of the present invention.

Example 2 using a sodium compound (sodium hydroxide in this Example) as an absorbent will be explained hereinafter. FIG. 2 shows a constitution example of a geothermal power plant having the desulfurization apparatus of the present invention. FIG. 3 shows a detailed constitution example of the desulfurization apparatus of this Example. The same elements as those in Example 1 shown in FIG. 1 are shown by the same reference numerals, and explanations thereof will be omitted.

The above geothermal power plant has a gas-liquid separator 1 for separating geothermal fluid A ejected through a well into geothermal steam B and hot water C, a turbine 3 which is driven with the geothermal steam B to actuate a power generator 2, a condenser 5 for condensing water by cooling the geothermal steam B discharged from the turbine 3 with coolant D introduced with a pump 4, a cooling column 7 for cooling water withdrawn from a bottom portion of the condenser 5 with a pump 6 and discharging the cooled water as a coolant D, and a desulfurization apparatus 10a for removing hydrogen sulfide from uncondensed gas E in the geothermal steam B introduced from a top portion of the condenser 5 with an extraction pump 8.

The desulfurization apparatus 10a has a combustion furnace 11 for combusting uncondensed gas E by reacting it with air F, an absorption reactor 20 for bringing combustion gas G, which results from the combustion of uncondensed gas E in the combustion furnace 11, into gas-liquid contact with an absorbent slurry H1 containing an absorbent M1 (sodium hydroxide) and further for bringing the above slurry into gas-liquid contact with air I to proceed with an oxidation reaction, and a filter 30 for solid-liquid separating a floating solid from a sulfate slurry J1 (containing sodium sulfate) formed in the absorption reactor 20.

The above absorption reactor 20 comprises an absorption column 21, an oxidation column 22 and the like as shown, e.g., in FIG. 3 if described in detail. The detailed constitution of the absorption reactor 20 will be explained with reference to FIG. 3 below.

The absorption column 21 is of a countercurrent column in which combustion gas G is introduced through a gas inlet portion 21*a* positioned on a side wall of its lower portion and it is introduced out as clean exhaust gas N through a gas outlet portion 21*b* positioned in its upper portion. In its bottom portion, a tank 21*c* for reserving the absorbent slurry Hi is formed. It is arranged that the tank 21*c* is supplied with absorbent M1 of sodium hydroxide (Na(OH)) from a silo 23 as required.

The absorption column 21 has a constitution in which absorbent slurry H1 in the tank 21*c* is sucked up with a circulation pump 24 and ejected through each of nozzles of a spray pipe 21*d* disposed in an upper portion of the absorption column 21, to be effectively brought into gas-liquid contact with introduced combustion gas G when it flows down through a filler 21*e*. In this constitution, further, water for industrial use or feed water W from condensed water in the above condenser 5 is sprayed through a spray pipe 21*f* or 21*g* provided in the gas inlet portion 21*a* or the gas outlet portion 21*b*, so that water is re-supplied to the absorbent slurry H1 and that part of sulfurous acid gas absorption reactions shown by the above reaction formulae (2) and (3) take place.

Part of air discharged from a blower 25 is blown into the slurry in the tank 21*c* of the absorption column 21 through an air blower tube 21*h* in the form of numerous fine air bubbles, whereby the oxidation to be described later is promoted. It is arranged that the slurry in the tank 21*c,* as a slurry J0 containing sulfate and sulfite, is introduced to an oxidation column 22 through a tube line which in this case is branched from the outlet side of the circulation pump 24.

The case shown in FIG. 3 has a constitution in which the gas outlet portion 21*b* of the absorption column 21 is provided with a mist eliminator 21*i* so that mist in the exhaust gas N which is to be introduced out is eliminated. Further, the desulfurized gas N which is to be introduced out is introduced to a top portion of a cooling column (shown in FIG. 2) and diffused into atmosphere with a fan 7*c* as described already.

The supply amount of the absorbent M1 is determined depending upon the amount of sulfurous acid gas to be absorbed. In an actual operation, for example, circulating slurry in the absorption column 21 is detected for a pH, and the supply amount can be controlled such that the pH value is maintained in a weakly acidic region. Further, for the supply amount of re-supply water W, circulating slurry in the absorption column 21 is detected for a concentration, or the liquid surface level in the tank 21*c* is detected, and the above supply amount can be adjusted such that the above concentration or the liquid surface level is maintained in an allowable range.

Further, the absorbent M1 may be formed into a slurry in a separate slurry tank in advance and supplied to the absorption column 21. A rotary atomizer or an arm-rotary sparger may be provided in place of the air blower tube 21*h*. Naturally, the tank 21*c* may be provided with a stirrer for promoting the gas-liquid contact and preventing the precipitation of a solid.

Further, the oxidation column 22 has a constitution in which slurry J0 introduced from the absorption column 21 resides for a predetermined period of time, then is discharged and introduced to a discharge filter supply pit 31 to be described later. Part of air I discharged from the blower 25 is blown into the slurry through an air blower tube 22*a* in the form of numerous fine air bubbles, whereby the oxidation according to the reaction formula (8) to be described later sufficiently takes place.

A filter 30 comprises a discharge filter supply pit 31, a discharge filter 32 and the like, for example, as shown in FIG. 3 if described in detail. The detailed constitution of the filter 30 will be explained with reference to FIG. 3 hereinafter.

The discharge filter supply pit 31 has a stirrer 31*a* and is used for reserving sulfate slurry J1 discharged from the above oxidation column 22 and diatomite Q supplied from a silo 33 while these are stirred. Slurry R in the discharge filter supply pit 31 is introduced to the discharge filter 32 at a predetermined flow rate with a slurry pump 34. In this case, the diatomite Q works as a filtering aid for the filtering in the discharge filter 32.

The discharge filter 32 has a constitution in which a floating solid in slurry R is allowed to adhere to the filter cloth surface of a filter element (not shown) and a liquid component is discharged as an effluent P, and in which the removed floating solid is dried by the intermittent air blowing of compressed air T and discharged through a hopper 35 in the form of a wet powder S.

The performance of the desulfurization apparatus 10*a* in the above geothermal power plant, i.e., one example of the desulfurization method of the present invention, performed with the desulfurization apparatus 10*a,* will be explained hereinafter.

First, uncondensed gas E is combusted in the combustion furnace 11, whereby hydrogen sulfide ($H_2S$) in the uncondensed gas E is converted to sulfurous acid gas ($SO_2$) according to the above reaction formula (1) (combustion step).

Then, combustion gas G containing the sulfurous acid gas, which combustion gas results from the combustion of the uncondensed gas E, is brought into contact with absorbent slurry H1 ejected from the above spray pipe 21*d* and water W sprayed from the above spray pipes 21*f* and 21*g,* whereby the sulfurous acid gas is absorbed, and clean discharge gas N containing almost no sulfurous acid gas is formed and in this case diffused into atmosphere through a top portion of the cooling column 7 with the fan 7*c*.

On the other hand, while absorbent slurry H1 circulating in the absorption column 21 absorbs sulfurous acid gas in combustion gas G which has been blown in, the absorbent slurry H1 is brought into contact with numerous air bubbles through the air blower tube 21*h* to be oxidized and further undergoes a neutralization reaction to form a sulfate ($Na_2SO_4$) and a sulfite ($Na_2SO_3$).

In the above steady state, there is formed a state in which the above sulfate, the above sulfite and a small amount of unreacted absorbent and impurities are suspended in the tank 21*c* of the absorption column 21, and the suspension is introduced to the oxidation column 21 as slurry J. In the oxidation column 21, an oxidation reaction is further proceeded with to oxidize all the amount of the sulfite in the slurry J into a sulfate, whereby the sulfite is a cause substance of COD (chemical oxygen demand) is completely eliminated (absorption reaction step).

Main reactions taking place in these treatments proceed through the above reaction formulae (2) and (3), and main reactions taking place in the tank 21c of the absorption column 21 and the oxidation column 22 proceed through the following reaction formulae (6) to (7).

(Reactions in Absorption Tank)

$$H^+ + HSO_3^- + 2Na(OH) \rightarrow Na_2SO_3 + 2H_2O \quad (6)$$

$$2H^+ + SO_4^{2-} + 2Na(OH) \rightarrow Na_2SO_4 + 2H_2O \quad (7)$$

(Reaction in Oxidation Column)

$$Na_2SO_3 + 1/2 O_2 \rightarrow Na_2SO_4 \quad (8)$$

Sulfate slurry J1 discharged from the oxidation column 22 is accordingly a slurry containing the above sulfate, a small amount of unreacted absorbent and a very small amount of impurities.

The above sulfate ($Na_2SO_4$) has a high solubility and is present in a state in which almost all of it is dissolved in a liquid. Almost all of the floating solid in the sulfate slurry J1 is formed of impurities ($Al_2O_3$, $Fe_2O_3$, etc.) included in the absorbent M1 and unreacted absorbent. And, the above floating solid is separated through the discharge filter 32 together with diatomite Q as a filtering aid, and disposed of as a wet powder S. On the other hand, the above sulfate ($Na_2SO_4$) is dissolved in an effluent P from the discharge filter 32, while this sulfate is harmless and therefore can be very easily disposed of by draining.

As explained above, according to the above desulfurization apparatus or the above desulfurization method, detrimental hydrogen sulfide in uncondensed gas separated from steam exhausted from a geothermal power plant is removed, and the byproduct (sodium sulfate) can be disposed as an effluent as it is. Therefore, the present invention can take part in environmental protection and further, the troublesome safening treatment of the byproduct is no longer necessary, the operation is eased, and industrially practical advantages can be obtained. In this Example in particular, a large-scale solid-liquid separator (e.g., centrifugal separator) is not necessary as compared with the embodiment (Example 1) where limestone is used as an absorbent to form product gypsum as a byproduct, and the handlings (transportation and storage) of the byproduct are not necessary, so that there are advantages that the equipment cost and the operation cost are lower.

The present invention is limited to the above two embodiments, and can be applied to a variety of embodiments. For example, as a absorbent, a calcium compound and a sodium compound can be used in combination. In this case, sulfates containing gypsum are formed, and it is necessary to separate formed gypsum by providing the solid-liquid separation step using a centrifugal separator, etc. On the other hand, a filtrate from the solid-liquid separation step contains formed sodium sulfate, and it can be therefore disposed of by draining without recycling it. In this case, a solid content obtained by the solid-liquid separation contains unreacted absorbents and the above impurities contained in the absorbents in addition to the gypsum, while they cause no problem since their amounts are vary small as compared with the amount of the gypsum.

In the constitution example shown in FIG. 3, the oxidation column 22 is provided separately from the absorption column 21, while there may be used a constitution in which the whole amount of the sulfite is oxidized in the absorption tank 21c by setting the blow amount and the blow method of air into the absorption tank 21c and the oxidation column 22 is omitted. Further, when the amount of the impurities which are contained in the absorbent and form the floating solid in the slurry is small, or when these impurities cause no problem even if the effluent contains them, the discharge filter supply pit 31 and the discharge filter 32 in the constitution example shown in FIG. 3 may be omitted, and further, devices such as the silo 33 and the hopper 35 (i.e., the filter 30) may be omitted.

We claim:

1. A method of removing hydrogen sulfide from an uncondensed gas separated from geothermal previously steam employed in a geothermal power plant comprises the steps of:

(a) combusting the uncondensed gas to convert hydrogen sulfide present in the uncondensed gas to sulfur dioxide resulting in a combustion gas; and (b) contacting an absorbent slurry containing at least one sodium absorbent compound with (i) the combustion gas and (ii) air, said contacting step providing for the absorption of the sulfur dioxide by the at least one absorbent compound, oxidation, and neutralization and produces (i) a desulfurized exhaust gas and (ii) a sodium sulfate-containing slurry that is at least substantially free of sulfites.

2. The method of claim 1, wherein the method further comprises the solid separation step of filtering the sodium sulfate slurry.

3. A method for processing geothermal steam containing hydrogen sulfide previously used to generate electricity in a geothermal power plant comprises the steps of:

(a) discharging geothermal steam from a turbine;

(b) separating in uncondensed gas containing hydrogen sulfide from water in the geothermal steam;

(c) combusting the uncondensed gas to convert hydrogen sulfide present in the uncondensed gas to sulfur dioxide resulting in a combustion gas; and (d) contacting an absorbent slurry containing at least one sodium absorbent compound with (i) the combustion gas and (ii) air, said contacting step providing for the absorption of the sulfur dioxide by the at least one absorbent compound, oxidation, and neutralization and produces (i) a desulfurized exhaust gas and (ii) a sodium sulfate-containing slurry that is at least substantially free of sulfites.

* * * * *

UNITED STATES PATENT AND TRADEMARK OFFICE
CERTIFICATE OF CORRECTION

PATENT NO. : 6,068,822
DATED : May 30, 2000
INVENTOR(S) : Kotake et al.

Page 1 of 1

It is certified that error appears in the above-identified patent and that said Letters Patent is hereby corrected as shown below:

<u>Title page, Item [54], LINE 1, COLUMN 1,</u>
"DESULFORIZATION" should read -- DESULFURIZATION --.

<u>Column 12,</u>
Lines 23-24, "previously steam employed" should read -- steam previously employed --;
Line 46, "in" should read -- an --.

Signed and Sealed this

Eighteenth Day of September, 2001

Attest:

*Nicholas P. Godici*

NICHOLAS P. GODICI
*Attesting Officer*   *Acting Director of the United States Patent and Trademark Office*